United States Patent Office 3,523,077
Patented Aug. 4, 1970

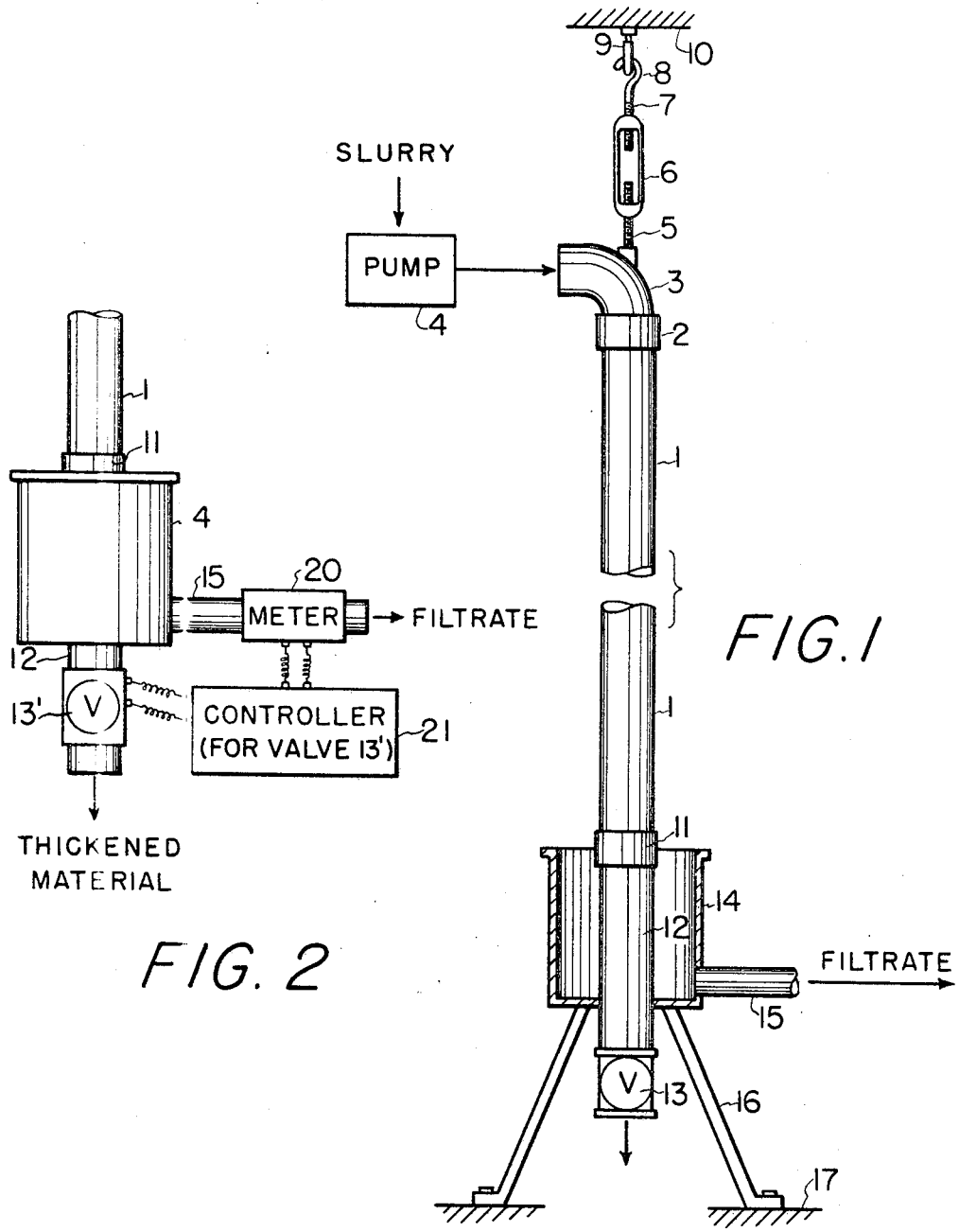

---

3,523,077
UNI-FLOW FILTER AND METHOD
Wayne M. Camirand, Albany, and Karel Popper, Danville, Calif., assignors to the United States of America as represented by the Secretary of Agriculture
Filed Oct. 11, 1968, Ser. No. 766,696
Int. Cl. B01d 29/14, 29/30, 37/04
U.S. Cl. 210—65                                            11 Claims

ABSTRACT OF THE DISCLOSURE

Apparatus for filtration which utilizes a vertically-positioned, foraminous, flexible hose as a filter chamber. Means are provided for receiving filtrate which passes through the wall of the hose and for discharging accumulated thickened material from the base of the hose.

---

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has among its objects the provision of novel apparatus and process for conducting filtrations. Further objects of the invention will be evident from the following description and the annexed drawing.

In the annexed drawing, wherein like numerals represent like parts:

FIG. 1 depicts, partly in cross-section, a form of apparatus in accordance with the invention. To reduce the size of the figure, a portion of hose 1 has been omitted.

FIG. 2 is a fragmentary view illustrating a system for correlating the discharge of thickened material with the efflux of filtrate.

A particular advantage of the filter in accordance with the invention is that it embodies what may be termed a uni-flow principle, i.e., the slurry to be filtered, the filtrate, and the thickened residue (filter cake) all flow in one and the same direction—downwardly. In this way the flow of each material involved in the operation complements—and even assists—the flow of the other materials. The net result is that high filtration rates are achieved and the apparatus operates successfully on slurries—such as freshly-precipitated calcium, magnesium, and ferrous hydroxides—which are exceedingly difficult to handle in known filtration devices. For example, with conventional plate-and-frame filters one must precoat the filter surfaces with diatomaceous earth or other filter aid in order to be able to handle a freshly-precipitated inorganic hydroxide. With the apparatus of the invention the use of filter-aids is unnecessary; inorganic hydroxides can be filtered directly even if they are freshly-precipitated. Contributing to the superior results obtained with our device is that solids can readily settle in the filtration chamber. Indeed, such action is enhanced by the downward movement of the incoming material to be filtered. Moreover, because of this settling action and downward movement of the incoming slurry, the filter surfaces are continuously scavenged or swept so that there is no build-up of deposits which might hinder the passage of liquid through the filter surfaces.

Another particular advantage of the apparatus is its simplicity; the device can be fabricated by any mechanic from stock items available in commerce. Also, the device may be easily moved about for use in different locations. This ready portability is particularly due to the fact that the filtration chamber is formed of a length of flexible foraminous hose. When the device is to be moved this hose can be rolled up so that the whole device than takes up a small volume.

Another important feature of the invention is that the filter chamber (the flexible foraminous hose) provides an unobstructed, straight-line passageway from its inlet to its outlet. This type of construction yields significant advantages. The flow of liquids is not hampered so that the entire length of the filter chamber is available for filration (movement of liquid through the foraminous wall of the chamber) and for downward flow of thickened slurry within the chamber. Moreover, with this type of construction, thickened slurry can be flushed out of the chamber very effectively. On the other hand, it can be readily visualized that with known devices which utilize filter chambers that are labyrinthine, convoluted, looped, or otherwise providing a devious passageway, there will necessarily be areas of restricted flow and even stagnancy with the result that deposits will build up in these areas whereby the surface available for filtration will be reduced and the system will become choked so that thickened slurry cannot be effectively flushed out of the chamber.

Contrary to many types of conventional filters, the device of the invention does not employ any vacuum-producing equipment or any vacuum-retaining compartments. Thereby the filter in accordance with the invention offers the advantages of simplicity and savings in initial and operating costs. The force for effecting the movement of liquid through the foraminous wall and for flushing out thickened material is obtained by pumping the slurry into the foraminous hose and by utilizing the head created by the column of liquid within the hose. Because of this use of a positive pressure system, there is no need for any complex rigid structural arrangement as would be required in a vacuum system; the foraminous hose is inherently capable of resisting high pressures even though made of flexible material.

A form of apparatus in accordance with the invention is illustrated in the annexed drawing. Referring thereto, flexible hose 1 forms the filter chamber of the device. This hose has a foraminous wall so that liquid from the slurry to be filtered will pass through the wall, whereas solids will be retained within the hose. Excellent results have been attained employing, as hose 1, commercially-available canvas hose sold in nursery supply houses as garden trickling hose. It is obvious, however, that other types of liquid-permeable hoses can be used such as those made from nylon, polyester fibers, polypropylene fibers, glass fibers, etc. To provide an extensive surface area for filtration and to minimize the distance that particles have to travel to reach the foraminous wall, the length of hose 1 should be at least 25 times, preferably at least 100 times, the diameter of the hose.

At its upper end, hose 1 is connected via coupling 2 to feed pipe 3. The slurry to be filtered is introduced under pressure into feed pipe by pump 4.

To support hose 1 there is provided an arrangement of: threaded rod 5 attached to feed pipe 3; turnbuckle 6; and threaded rod 7 ending in hook 8. Hook 8 is engaged with eye 9 fastened to ceiling 10, or other supporting structure.

At its lower end, hose 1 is connected to discharge pipe 12 via coupling 11.

A valve 13 is provided at the base of discharge pipe 12 for periodic elimination of thickened matter which accumulates in pipe 12 and in the lower portion of hose 1. Valve 13 is preferably of the type which when open provides a passageway of essentially the same cross-section as that of hose 1. In this way a good sweeping-out of thickened material is attained and there is no possibility of building up any dense masses in pipe 12 or hose 1 which might impede action of the device. Taking this matter into account, as valve 13 one preferably uses a plug valve, butterfly valve, gate valve, or a valve of the iris type.

Fastened to discharge pipe 12 is cylindrical filtrate receiver 14 provided with outlet pipe 15.

To maintain the lower portion of the device in position, there are provided legs 16 which are fastened at their upper ends to receiver 14 and at their lower ends to floor 17, or other supporting structure. Best results are obtained when hose 1 is constrained so that its axis is plumb. This can easily be arranged by making sure that eye 9 is directly over the center of discharge pipe 12 and by tightening turnbuckle 6 so that hose 1 is maintained as a straight vertical column.

In operation of the device, the slurry to be filtered is pumped into the top of hose 1. To utilize the full capacity of the filter, the rate of pumping is adjusted so that hose 1 is maintained full (except at the times of periodic flushing). The liquid content of the slurry passes radially through the wall of hose 1 and then flows downwardly along the outside of the hose into receptable 14 and from there into outlet 15. The residual (de-liquefied) material remaining within hose 1 moves downwardly within the hose 1 impelled by the continued influx of slurry into the top of the hose. During the operation, valve 13 is operated at periodic intervals to flush out the thickened material which acccumulates in discharge pipe 12 and the lower portion of hose 1. Valve 13 may be operated manually or it may be of the solenoid type, activated by a timer or a volume-sensing mechanism programmed to open at intervals to release each time a volume of thickened material which is proportionate to the volume of entering slurry or discharging filtrate.

Reference is now made to FIG. 2 which illustrates a system for automatic discharge of thickened material. In this modification, outlet pipe 15 is provided with a volume-sensing meter 20 which programs controller 21 to open solenoid valve 13' (corresponding to valve 13 in FIG. 1) at intervals to release a predetermined amount of thickened material. For example, one may set the parameters of the system so that every time 25 gallons of filtrate are discharged through outlet 15, valve 13' is opened long enough to flush out a gallon of thickened material.

In any particular case the proportions of these effluents may be varied depending on such circumstances as the solids content of the original slurry, etc.

Hereinabove it has been mentioned that best results are attained when hose 1 is maintained as a straight vertical column. When this is done the total circumference of the hose at any given level is uniformly used for filtration; there is no build-up of localized masses of filter cake on any portion of the circumference. Where, however, the hose has any bends—as it may if not drawn taut—deposits of filter cake may build up on the inside of the bend (much as a river will deposit silt at stagnant areas or the inside of bends). These localized deposits will interfere with filtration and with flushing out of thickened material.

EXAMPLES

The invention is further demonstrated by the following illustrative examples, wherein parts and percentages are by weight unless otherwise specified.

The runs detailed in the examples were carried out on a filter having the structure shown in FIG. 1, wherein hose 1 was a foraminous cotton canvas hose 16 feet long and 1¼ inches in diameter, identified in the trade as grade GS-30 and normally used as a garden trickling hose. The pressures referred to below were measured at the lowest point in the filter system.

Example 1

In this run, the starting material was a slurry containing 4% calcium hydroxide and 95% tap water. This slurry was pumped into the filter at pressures varying from 12 to 20 p.s.i.g. The flow of filtrate was observed to vary with pressure, without, however, being a linear function of that variable. The flow rate at 12 p.s.i.g. was 7 gallons per minute; at 20 p.s.i.g. it was 9.5 gallons per minute. The filtrate was clear over the entire pressure range.

Example 2

In these runs, freshly-precipitated magnesium hydroxide was prepared by adding aqueous sodium hydroxide to dilute aqueous solution of magnesium chloride. In one case (A), the resulting slurry contained 1% $Mg(OH)_2$ in another case (B), the slurry contained 0.1% $Mg(OH)_2$. Without any delay after preparation, the slurries were pumped into the filter at 12 p.s.i.g. The results are tabulated below:

|  | $Mg(OH)_2$ in slurry, percent | Flow rate of filtrate, gal./min. | Condition of filtrate |
| --- | --- | --- | --- |
| Run: |  |  |  |
| A | 1.0 | 0.9 | Clear. |
| B | 0.1 | 1.0 | Do. |

Having thus described the invention, what is claimed is:

1. Apparatus for filtering which comprises, in combination—
   a foraminous flexible hose,
   detachable means for maintaining the hose in a vertical position,
   means for introducing a slurry into the upper end of the hose,
   valve means communicating with the lower end of the hose for periodic discharge of thickened material accumulating is the base of the hose, and
   receptacle means mounted about the hose at the lower end thereof for receiving liquid which passes through the hose and runs downwardly along the exterior thereof.

2. The apparatus of claim 1 wherein the hose has a length at least 25 times its diameter.

3. The apparatus of claim 1 wherein the hose has an essentially uniform diameter.

4. The apparatus of claim 1 wherein the hose is arranged to provide an unobstructed straight-line passageway from top to bottom thereof.

5. The apparatus of claim 1 wherein the hose is positioned with its exterior exposed to the atmosphere.

6. The apparatus of claim 1 wherein the hose is fabricated of textile material and can be rolled into a compact bundle when the apparatus is not in use.

7. The apparatus of claim 1 wherein the valve means when open provides a passageway of about the same cross-section as that of the hose.

8. Apparatus for filtering which comprises, in combination—
   a foraminous flexible hose of uniform diameter having a length at least 100 times its diameter,
   an inlet coupled to the top of the hose,
   an outlet coupled to the bottom of the hose,
   detachable support means cooperative with said inlet and outlet for maintaining the hose in a vertical position to provide a filter chamber having an unobstructed straight-line passageway from the inlet to the outlet,
   means for pumping a slurry to be filtered into the hose through the inlet,
   valve means communicating with the outlet for periodic discharge of thickened material accumulating in the lower portion of the hose, and
   receptacle means mounted about the hose at the lower end thereof for receiving liquid which passes through the hose and flows downwardly along the exterior thereof.

9. A continuous uni-flow method for filtering a slurry of a liquid and suspended solid particles denser than the liquid which comprises providing an elongated vertical chamber surrounded by a foraminous wall, continuously pumping the said slurry into the top of the chamber and downwardly therein whereby filtration is effected and thickened material moves downwardly within the chamber, continuously collecting the filtrate which passes through the foraminous wall and which flows downwardly along the exterior thereof, continuously metering the amount of collected filtrate, and periodically releasing from the bottom of the column a portion of the liquid contained therein proportionate to the amount of filtrate collected whereby to discharge thickened material from the column.

10. Apparatus for filtering which comprises, in combination— a foraminous flexible hose, means for maintaining the hose in a vertical position, means for introducing a slurry into the upper end of the hose, valve means communicating with the lower end of the hose for periodic discharge of thickened material accumulating in the base of the hose, receptacle means mounted about the hose at the lower end thereof for receiving liquid which passes through the hose and runs downwardly along the exterior thereof, and control means responsive to the efflux of filtrate for actuating the valve means for periodic discharge of thickened material.

11. Apparatus for filtering which comprises, in combination— a foraminous flexible hose, means for maintaining the hose in a vertical position, means for introducing a slurry into the upper end of the hose, valve means communnicating with the lower end of the hose for periodic discharge of thickened material accumulating in the base of the hose, receptacle means mounted about the hose at the lower end thereof for receiving liquid which passes through the hose and runs downwardly along the exterior thereof, and adjustable tensioning means for maintaining the hose in a taut condition.

References Cited

UNITED STATES PATENTS

| | | | |
|---|---|---|---|
| 3,389,795 | 6/1968 | Wintzer | 210—112 |
| 3,423,313 | 1/1969 | Messer | 210—433 X |

JAMES L. DeCESARE, Primary Examiner

U.S. Cl. X.R.

210—114, 232, 448